Figure 1:
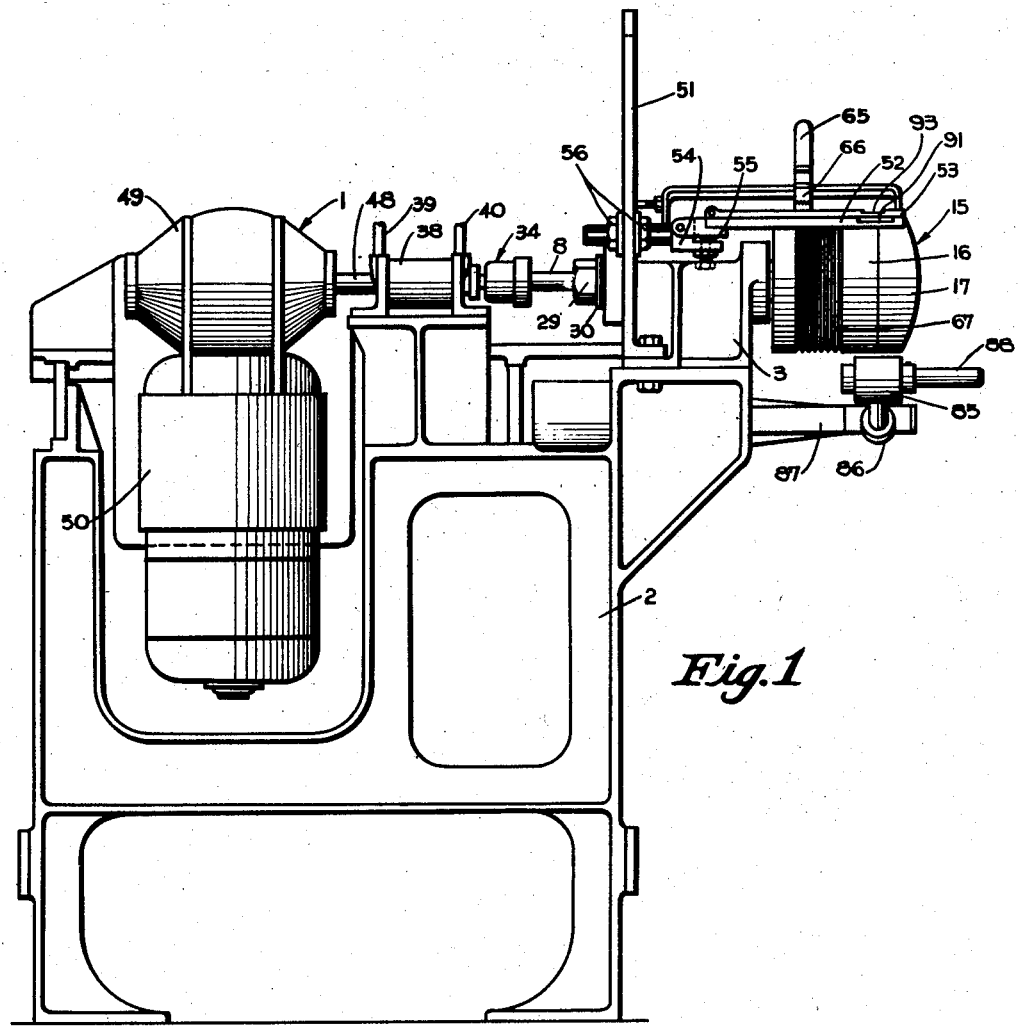

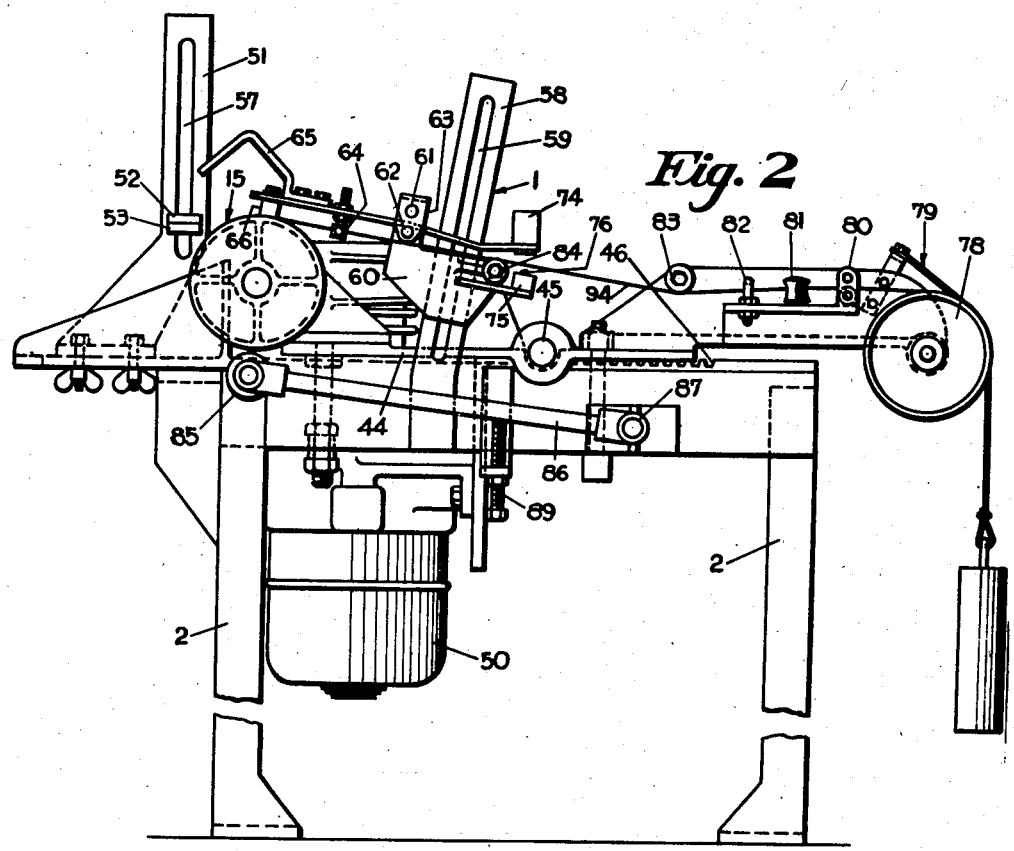
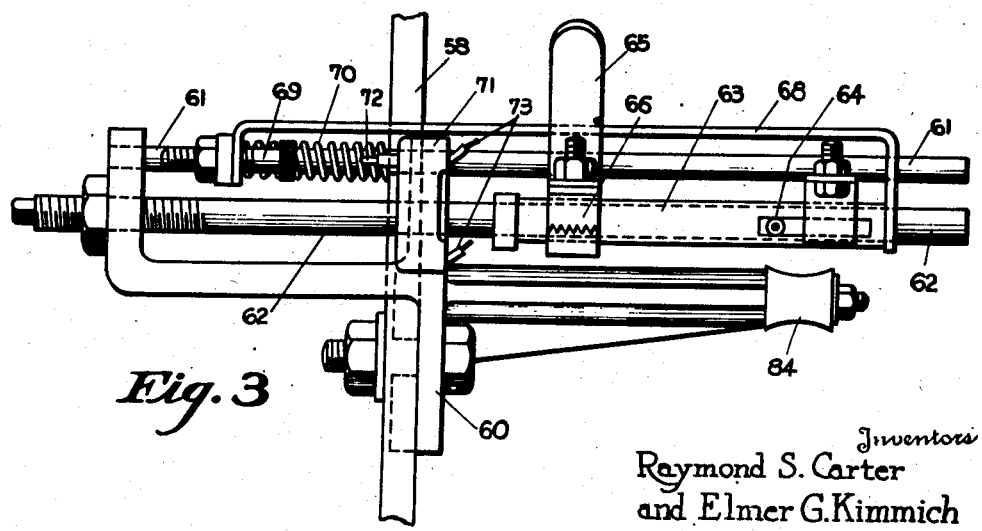

June 6, 1950     R. S. CARTER ET AL     2,510,553
APPARATUS FOR MANUFACTURING ENDLESS BELTS
Filed Sept. 18, 1945     3 Sheets-Sheet 3

Inventors
Raymond S. Carter
and Elmer G. Kimmich

By

Attorney

Patented June 6, 1950

2,510,553

UNITED STATES PATENT OFFICE 2,510,553

APPARATUS FOR MANUFACTURING ENDLESS BELTS

Raymond S. Carter, Cuyahoga Falls, and Elmer G. Kimmich, Akron, Ohio, assignors to Wingfoot Corporation, Akron, Ohio, a corporation of Delaware Application September 18, 1945, Serial No. 617,046

8 Claims. (Cl. 154—3)

1

The present invention relates to a process and apparatus for the manufacture of endless, reinforced belts and the like. More particularly, the invention is concerned with a method of and means for building V-belts and other forms of belts embodying a strandular reinforcing such, for example, as cord, wire, cable and the like.

It is an object of the present invention to provide a method and means for facilitating the manufacture of endless belts of the type embodying internal reinforcing material and according to which the belts are built up in inverted form and reversed upon completion.

It is another object of the present invention to provide apparatus comprising means for placing the strandular reinforcing for incorporation in the finished belt.

It is a further object of the present invention to provide a method and apparatus by which the completed belt may be readily removed from the supporting surface on which it is built without the necessity of disassembling the supporting member and without distorting the finished belt.

Another and still further object of the present invention is to provide means for arranging the strandular reinforcing material in the course of the building operation and simultaneously controlling the operation of the member providing the supporting surface on which the several elements of the belt are assembled.

It is a still further object of the present invention to provide a novel and economical method of forming reinforced V-belts and the like and the apparatus for carrying out the process.

Other objects and features of the present invention will become apparent as the detailed description of the invention proceeds.

Although the invention is capable of application to the manufacture of various types of belting and the like, it is particularly advantageously adapted to be employed in the fabrication of endless wire-reinforced V-belts and the like.

The apparatus contemplated by the present invention comprises, among other things, a forming means which provides a generally cylindrical supporting surface made up of a plurality of coaxially arranged segments defining a circumferential separable joint therebtween, means for rotating the forming means, means feeding strandular reinforcing material to the forming means, guide means for applying the belt materials to the forming means, means controlling the operation of the rotating means to drive the forming means in a clockwise and a counterclockwise direction, means actuated by the feeding means

2 during its operation to prevent the rotation of the forming means in one of its directions of rotation, adjustable means coacting with the feeding means to stop the forming means at a predetermined interval in the course of the building operation, and means for separating the segments of the forming means along the circumferential joint therebetween to facilitate removal of the belt.

The method of the invention embodies the steps of applying the several elements of the belt over the joint defined by the segments comprising the supporting surface and, upon completion of the forming operation consolidating the several elements, separating the segments and removing the finished belt.

Figures 4, 5, 6, 7, 8:
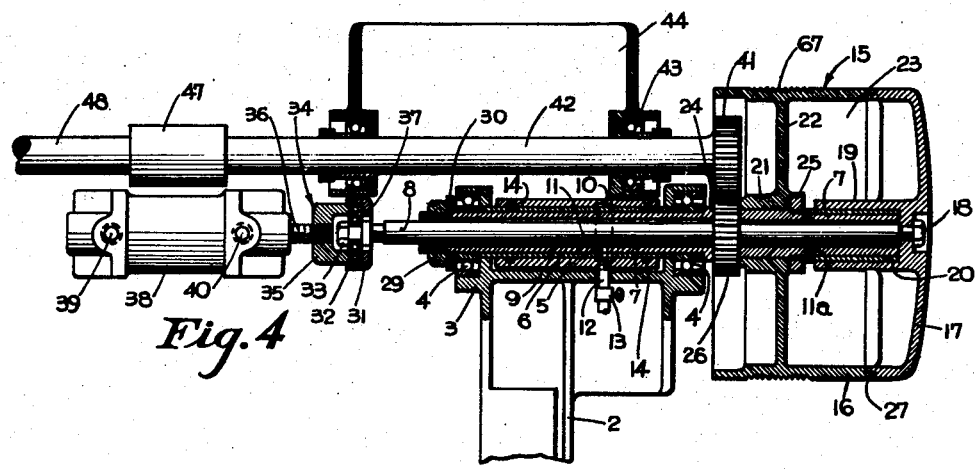

For a better understanding of the invention, reference should be had to the accompanying drawings in which Figure 1 represents a front elevation of a typical apparatus illustrating the teachings of the present invention. Figure 2 is a side elevation of the machine of Figure 1. Figure 3 is an elevation on an enlarged scale of the strand feeding mechanism employed in the apparatus of Figures 1 and 2. Figure 4 is horizontal section with parts in elevation and broken away illustrating the drive and separating mechanism associated with the building drum of the machine of Figure 1. Figures 5 to 8, inclusive, illustrate the several steps employed in the belt building operation.

In Figure 1, a typical form of apparatus embodying the teachings of the present invention and hereinafter referred to simply as a "drum former" is designated generally by the reference character 1. The drum former 1 has a frame 2 on which is mounted a housing member 3. The housing 3, as will best be seen from Figure 4 of the drawings, is provided with a pair of spaced bearings 4 which are preferably of the antifriction type and support a hollow shaft 7 in rotatable relation. Surrounding the hollow shaft 7 is a sleeve 5 supported from the housing 3 as by means of a bushing 6 within which the shaft is free to rotate.

The hollow shaft 7 has a spindle 8 extending through, and comparatively loosely fitted in its inner bore 9. An annular passage 10 is cut in the inner periphery of the sleeve 5 and is provided with an opening 11 which extends through the wall of shaft 7 and communicates with the inner bore 9 thereof. A pipe connection 12 extends through the housing 3 and registers with the outlet 11 so as to connect with the annular passage 10 in the sleeve 5. A pair of outlets 11a adjacent the other end of the spindle 8 extend through the wall of the hollow shaft 7 and likewise communicate with the inner bore 9 thereof.

Packing rings 14 are advantageously inserted in the housing 3 and spaced on opposite sides of the outlet 11 for sealing the sleeve 5 with respect to its bushing 6. The pipe 12 is adapted to be connected to a supply of compressed air and is provided with a suitable valve 13 for controlling the introduction of air to the inner bore 9 of the hollow shaft 7. The packing rings 14 serve to prevent the escape of the air between the sleeve 5 and the bushing 6. This apparatus functions as an auxiliary means employed in the manner and for the purposes hereinafter to be described in detail.

A drum 15 is mounted upon the free end of the hollow shaft 7 extending beyond the housing 3 and comprises a cylindrical segment 16 which cooperates with a coaxially disposed generally disk-like member or cap 17 to provide the building surface upon which the belts are fabricated. The cap 17 is secured as by means of a nut 18 to the end of the spindle 8 extending beyond the end of the hollow shaft 7. The cap 17 of the drum 15 is provided with an internally disposed hub portion 19 in which is disposed a bushing 20 which is adapted to insure slidable movement in an axial direction along the outer periphery of the free end of the hollow shaft 7, as indicated in Figure 4.

The cylindrical segment 16 of the drum 15 is provided with an internally disposed hub portion 21 which is advantageously formed integrally with the web 22 of the said cylindrical segment 16. The web 22 of the cylindrical segment 16 cooperates with the cap 17 to form internally of drum 15 a closed chamber 23 with which the aforementioned outlets 11a extending through the wall of the hollow shaft 7 to the bore 9 thereof communicate. The chamber 23 is made substantially airtight by virtue of the interfitting relationship between the cap 17 and the cylindrical segment 16 of the drum 15. A substantial tongue and groove engagement, indicated generally by the reference character 27, is provided between the cylindrical segment 16 and the cap 17 and serves to form the peripheral joint 28 on the external surface of the drum 15.

A collar portion 24 which is advantageously formed integrally with the hollow shaft 7 and a jam nut 25 threaded upon the outer periphery of the hollow shaft 7 cooperate to confine the hub portion 21 of the cylindrical segment 16 in the desired axial alinement on the hollow shaft against endwise displacement. A drive gear 26 is secured in any suitable fashion to the hub portion 21. The hollow shaft 7 is retained in fixed axial relationship with respect to the housing 3 as by means of a nut 29 backed by a washer 30 and disposed adjacent to one of the bearings 4 in said housing. An integrally formed collar portion 31 on the spindle 8 is adapted to position a suitable bearing 32, which is advantageously of the antifriction type. The bearing 32 is held in place on the spindle 8 against collar portion 31 by the nut 33 threaded on the end of said spindle.

A coupling unit 34 embodies a cup-shaped member 35 which is threaded onto the end of the piston shaft 36 projecting from the pneumatic cylinder 38 and cooperates with the cap 37 to form a housing for the bearing 32 mounted on the end of the spindle 8. Inlets 39 and 40 supply fluid under pressure to the pneumatic cylinder 38 to actuate a piston (not shown) therein to produce an axial thrust upon the piston shaft 36 and through the coupling unit 34 to the spindle 8. The pneumatic cylinder 38 which is adapted to be controlled by a suitable valve unit (not shown) of a conventional type causes the spindle 8, by virtue of the action of the piston, either to retain the cylindrical segment 16 and the cap 17 in interfitting relation at the joint 28 therebetween or to separate the parts of the drum 15 at said joint.

A gear 41 mounted upon a drive shaft 42 which is rotatably supported by a pair of spaced bearings 43 mounted in a movable table 44 serves to mesh with the drive gear 26 on the hub portion 21 of the cylindrical segment 16 for driving the drum 15. The movable table 44 is advantageously adapted to be shifted from one position to another along the upper portion of the frame 2 in order that the apparatus may be employed, by the substitution of a different size drive gear 26 and drum 15, to manufacture endless belts of various sizes. The movement of the table 44 is accomplished by the operation of the pinion 45 along the rack 46 which is accomplished by a demountable crank (not shown). By virtue of this construction, different building drums 15 of widely varying sizes may be employed with comparative ease and without the necessity of reconstructing the apparatus.

The drive shaft 42 actuating the driving gear 41 is directly coupled as by means of the coupling 47 to the output shaft 48 of a speed change mechanism 49 which is driven, in turn, by an electrical motor 50. The motor 50 is advantageously a two speed, three phase, induction motor capable of reversible operation. The motor 50 and the speed change mechanism 49 are mounted upon the movable table 44 so as to render them capable of shiftable movement along with the drive shaft 42 with which they are interconnected when it becomes necessary to change drum sizes. Suitable locking means (not shown) are employed to retain the movable table 44 in position against inadvertent shifting thereof when a specific size building drum 15 and its associated driving gear 26 are mounted upon the machine.

A support 51 is secured to a portion of the frame 2 of the drum builder 1 and provides a mounting for a pair of guide plates 52 and 53 which are employed in directing the fabric and rubber materials to the drum 15 in the course of the belt building operations. The guide plate 53 is hingedly mounted upon the guide plate 52 in such a manner that it may be disposed in parallel and contiguous relation to the guide plate 52 when the latter, which is swingably mounted on the bracket 54, is in its horizontal position ready for use in the building operation. The bracket 54 has an adjusting screw 55 therein for adjusting the exact horizontal position of the guide plate 52 to insure its parallel relationship with respect to the axis of the drum 15. The bracket 54 has a pair of nuts 56 threaded thereon to enable it to be adjusted in a vertical direction with respect to the periphery of the drum 15 along the slot 57 in the support 51.

A second support 58 is mounted upon the frame 2 of the drum builder 1 and is provided with a longitudinally extending slot 59 in which a bracket 60 is adjustably secured. A pair of rods 61 and 62 disposed in parallel relation to each other and to the longitudinal axis of the building drum 15 are carried by the bracket 60. A guide means or carriage 63 is employed in winding the reinforcing material onto the belt elements in the building operation. The carriage 63 which may advantageously take the form of a flat bar mounted transversely of a tubular portion is adapted to slide axially of the rod 62 has been illustrated in detail in Figure 3 of the drawings.

The carriage 63 supports a guide eye 64 which is arranged to be adjustably secured to the tubular portion thereof. A handle 65 is attached to the carriage 63 together with a block 66 having a serrated face thereon. The grooved face of the block 66 is adapted to mesh with a helical thread 67 cut into the external periphery of the cylindrical segment 16 of the building drum 15. Thus, when the handle 65 is manually held down by the operator in the course of the building operation, the block 66 is caused to ride in the endless groove comprising the helical thread 67 thereby advancing the carriage 63 progressively in an axial direction along the rod 62 upon which it is slidably mounted.

An arm 68 is attached to the end of the tubular portion of the carriage 63 and is so disposed that the rod 61 passes through at the ends thereof. A knurled headed screw 69 is threaded into one of the bent end portions of the arm 68 in such a fashion that it may be adjusted in a direction parallel to the axis of the rods 61 and 62 being arranged in parallel relation and adjacent to the rod 61. A coil spring 70 extends around a portion of the rod 61 being confined between the bent portion of the arm 68 in which the screw 69 is threaded and the face of the bracket 60. The spring 70 is caused to be compressed as the carriage 63, upon engagement of the block 66 with the helical thread 67 on the drum 15, is moved axially of the rod 62. This action of the spring 70 enables the return of the carriage 63 to its original starting position, when the block 66 is disengaged from the helical thread 67 by releasing of the handle 65 by the operator.

The screw 69 is so adjusted in the bent end portion of the arm 68 on the carriage 63 that the head thereof will actuate an electrical switch 71 mounted upon the bracket 60 thereby acting as a limit means to control the extent of lateral movement of the carriage (see Figure 3). The nib 72 of the switch 71 is so disposed that it will be depressed upon contact with the head of the screw 69 when the carriage 63 has reached the extremity of its axial movement which corresponds with the completion of the application of the reinforcing material. A pair of electrical connections 73 serve to connect the switch 71 into the electrical circuit of the drum builder 1 in such a way as to cause the rotation of the drum 15 to stop when a sufficient length of the wire reinforcing material has been applied to the elements of the belt being built upon the surface of the drum.

In order to insure disengagement of the block 66 on carriage 63 with respect to the helical thread 67 on the cylindrical segment 16 of the drum 15 and after the winding operation is completed, a counterweight 74 is provided on the end of the arm portion of the carriage 63, as will best be seen in Figure 2 of the drawings. The counterweight 74 causes the carriage 63 to swing about the rod 62 on which it is slidably supported and simultaneously actuates a switch 75 mounted on the bracket 60 adjacent thereto. The switch 75 is so disposed that the nib 76 thereof will be depressed by the end of the arm portion of the carriage 63 as long as the counterweight 74 causes the carriage 63 to be tilted backward with the block 66 out of contact with the helical thread 67.

During this interval, when the reinforcing material is not being fed to the drum 15, the switch 75 which is connected into the circuit controlling the rotation of the drum is closed, thereby permitting the control mechanisms (not shown) to actuate the building drum 15 either in a clockwise or counterclockwise direction, depending upon the desire of the operator. However, during the time when the reinforcing material is being fed through the guide eye 64 of the carriage 63 to the building drum 15 or, in other words, when the handle 65 is depressed so as to cause the block 66 to engage the thread 67, the nib 76 of the switch 75 will be released. That portion of the control circuit embodying the switch 75 will thus be opened preventing the rotation of the drum 15 in a direction opposite to that required for the winding on of the reinforcing material.

The operation of the switches 71 and 75, both of which may advantageously take the form of microswitches or the like, will best be understood from the description of the operation of the drum builder 1 which follows.

The reinforcing material employed in the fabrication of the belts is supplied from a reel 78 which is mounted in any suitable fashion upon the frame 2 of the drum builder 1. A braking device 79 which is secured to the frame 2 and takes the form of a fabric strip supporting a weight on the end thereof coacts with the supply reel 78 to permit the reinforcing material to be fed to the drum 15 but at the same time acts to retain it in taut relationship as it is being withdrawn therefrom. A suitable tensioning guide 80, a pair of guide rollers 81, an eye 82, and a pair of roller guides 83 and 84 are disposed between the supply reel 78 and the drum 15 to enable the strandular reinforcing material to pass freely to the guide eye 64 on the carriage 63 during the winding operation.

In order to enable the several elements comprising the endless belts being built upon the surface of the drum 15 to be compressed or consolidated into a unitary structure, there is provided a compressor roll or stitcher 85 which is freely rotatably mounted upon a swingable arm 86 supported by a bracket 87 from the frame 2 of the drum builder 1. A handle 88 provided on the swingable arm 86 adjacent the stitcher 85 enables the operator to bring the roll in contact with the belt materials during the assembling operation. An adjustable screw 89 is provided on the frame adjacent the bracket 87 to adjust the location of the swingable arm 86 so as to raise and lower the stitcher 85 with respect to the periphery of the drum.

In the operation of the apparatus of the invention, any suitable form of electrical wiring circuit may be employed to energize and interconnect, in operative association, the various control switches as well as the prime mover, motor 50. The operation of the drum 15 by the motor 50 may be controlled by a number of conventional foot operated switches (not shown). An arrangement embodying three such switches is preferable in order that one will control the energization of the motor 50, which is, as previously indicated, of the two speed, reversible type, to rotate the drum in a direction toward the operator while the other two will cause the drum to be rotated away from the operator, one at a low speed and the other at a high speed. A conventional start-stop switch (not shown) controls entire circuit.

Let us assume that the operator has just completed the building of a belt and removed it from the drum 15, thus, placing the machine in readiness for the next building operation. The valve unit operating the pneumatic cylinder 38 is actuated to introduce air under pressure through inlet 40 to the cylinder moving the piston therein toward the left and bringing the cap 17 into engagement with the end of the cylindrical segment 16 of the drum 15 and closing the joint 28 therein. The drum 15 is now ready for the application of the belt building materials.

First, a flat fabric envelope 90 preferably comprising two plies of rubberized fabric material is applied to the surface of the drum 15 in the manner indicated in Figure 5. The joint 28 of the drum 15 advantageously bisects the width of the envelope 90. The fabric strips of the envelope 90 are guided into place by feeding the material through the slot 91 in the lowermost guide plate 52 with the plate 53 tilted back out of the way. As the operator guides the material over plate 52, the appropriate control switch or pedal (not shown) for energizing the motor 50 is depressed causing the drum 15 to rotate in a direction away from the operator so that the fabric winds onto the drum.

The guide plate 53 is then lowered into position on the plate 52 and a relatively thin gum strip 92 (see Figure 5) is applied to the outermost surface of the envelope 90 by feeding the strip through slot 93 on plate 53. During the guiding of the gum strip 92 into place, the drum is again rotated in a direction away from the operator. After the gum strip 92 has been applied and any excess material cut off the end so as to effect a smooth joint between the ends, the operator may bring the stitcher 85 into contact with the material by grasping the handle 88 and holding the swingable arm 80 in its uppermost position.

After the gum strip 92 has been intimately compressed against the fabric envelope 90, the operator grasps the free end of the wire 94, to be employed as the reinforcing material in the belt, and with a small portion of gum secures the wire end in place adjacent the left hand edge of the gum strip 92. The operator then grasps the handle 65 of the carriage 63 depressing the same and bringing the serrated face of the block 66 into engagement with the helical thread 67 on drum 15 in the manner indicated in Figure 5. The drum 15 is then rotated in a direction toward the operator by the actuation of the proper control switch or pedal (not shown) and the thread 67 causes the carriage 63 to move toward the right as seen in Figure 5 guiding the wire 94 through the guide eye 64 and forming a helix of wire about the gum strip 92.

As a safety measure, the depressing of the handle 65 causes the counterweight 74 (Figure 2) on carriage 63 to be lifted out of contact with the nib 76 of the electrical switch 75. The switch 75 is advantageously so connected into the electrical operating circuit of the machine that the electrical connections to both of the previously mentioned control switches or pedals (not shown) for actuating the motor 50 to drive the drum 15 in a direction away from the operator are broken. Thus, during the wire winding operation the drum 15 cannot be inadvertently rotated in the wrong direction.

The winding operation and the axial movement of the carriage 63 continues until the head of the adjusting screw 69, previously manually adjusted to provide a wire helix of a length sufficient to substantially cover the gum strip 92, strikes the nib 72 of the switch 71. At this point in the operation, the nib 72 of the switch 71 is depressed and, by reason of the fact that the switch is so connected into the electrical operating circuit of the machine that it controls the energization of the motor 50, the circuit to the motor will be broken and the drum 15 will automatically cease rotation. The operator then releases the handle 65 and the counterweight 74 swings the carriage 63 to once again depress the nib 76 of switch 75 bringing the other controls into the circuit in readiness for the succeeding operations.

The operator now cuts the wire 94 and secures the free end in place by a piece of gum rubber after which the whole is advantageously compressed by a stitcher roll. Next, the flexible cushion strip 95 is applied over the completed helix of wire 94. The strip 95 is preferably of vertically tapered cross section as, for example, in the form of a symmetrical trapezoid with the shortest of the parallel sides uppermost. As before, the strip 95 is guided to the drum 15 through the slot 93 in plate 53 and the control switch or pedal is operated to rotate the drum 15 in a direction away from the operator.

After the several belt materials have been properly compressed by suitable manual stitching means or the stitcher 85 as desired, the operator then turns or folds the lateral edge portions of the envelope 90 inwardly to cover the gum strip 92, wire 94 and cushion 95. The envelope 90 now completely covers the exterior of the finished belt in the manner indicated in Figure 7. The completed belt 96 will have the inverted form shown in Figure 8 and will have been completely stitched and smoothed. The drum 15 will advantageously be rotated at high speed in a direction away from the operator by depressing the appropriate control pedal (not shown) during the final stitching operation.

The operator now operates the valve unit controlling the operation of the pneumatic cylinder 38 releasing or shifting the position of the piston to the right and disengaging the cap 17 from cylindrical segment 16 of the drum 15 (see Figure 8). In this manner, the finished inverted belt 96 can easily be buttonholed off the unsupported end of the drum 15. The belt will then be turned inside out or reversed and is then ready for use.

If, for any reason, the belt 96 is so tightly engaged with the surface of the drum 15 that the cap 17 will not freely separate from the cylindrical segment 16, the valve 13 may be opened introducing air under pressure to the chamber 23 formed internally of the drum 15 (see Figure 4) and forcing the segments 16 and 17 apart. The air is caused to pass from the pipe 12 around the annular passage 10, through outlet 11 into bore 7 of hollow shaft 7 along the spindle 8 and out through outlets 11a into the chamber 23.

It will be readily understood that certain modifications may be made in the apparatus and the process hereinbefore described in detail in delineating the teachings of the present invention without in any way departing from the spirit or scope of the invention.

While in accordance with the patent statutes one best known embodiment of the invention has been illustrated and described in detail, it is to be particularly understood that the invention is not limited thereto or thereby, but that the inventive scope is defined in the appended claims.

What we claim is:

1. Apparatus for manufacturing endless wire-reinforced V-belts comprising a drum supported from one end only thereof and formed of at least two generally cylindrical portions mutually interfitting in end-to-end relation, means mounted adjacent the drum for movement axially thereof for feeding belt materials to the drum, means on the drum for actuating the feeding means, drive means rotating the drum, means actuated by the feeding means to control the operation of the drive means, and valve operated means for separating the drum portions.

2. Apparatus for manufacturing an endless, wire-reinforced V-belt comprising a rotatably mounted generally cylindrical drum of cantilever construction embodying two coaxially arranged segments forming therebetween a separable circumferential joint, reversible driving means adjacent the supported end of the drum for actuating the same in a clockwise and a counterclockwise direction, a carriage mounted in close proximity to the periphery of the drum for shiftable movement in a direction parallel to the axis of said drum, said carriage being actuated by the drum, a supply of wire adjacent the drum, a guide on said carriage for directing the wire to the drum on which it is wound in helical form by the simultaneous cooperation of the rotation of the drum and the axial travel of the carriage, control means operated by the guide for preventing the rotation of the drum in one of its directions of rotation during the operation of the carriage, an adjustable abutment assciated with said guide for stopping the driving means when the wire helix reaches a predetermined length, biasing means returning the carriage to its original starting position after the completion of the winding operation and releasing the control means, a fixed feeding means disposed adjacent the drum for directing the belt materials during the building operation to the drum periphery over the joint therein, and means for separating the drum segments on completion of the belt and facilitating its removal from the drum.

3. Apparatus for manufacturing endless belts comprising a frame; a drum embodying two interfitting generally cylindrical portions disposed in end-to-end relation and defining therebetween a separable circumferential joint; means journaled in the frame for supporting and driving the drum; a carriage mounted adjacent the drum for shiftable movement in an axial direction with respect thereto; a guide on the carriage for laying belt material on the drum adjacent the joint therein; means on the drum for actuating the carriage; means on the carriage for selective engagement with the actuating means; and valve operated means for separating the two portions of the drum.

4. Apparatus for manufacturing endless belts comprising a frame; a drum embodying a generally cylindrical portion and a substantially dished end portion rotatably mounted on the frame in coaxial relation to form a separable circumferential joint between said portions; means for driving the drum; a carriage mounted adjacent the drum for shiftable movement axially of the drum; a guide on the carriage for laying belt material on the drum adjacent the joint therein; means on the drum for actuating the carriage as the drum is rotated; means on the carriage for selective engagement with the actuating means; and a pneumatic cylinder for separating the drum portions on completion of the belt and for removal of the belt.

5. Apparatus for manufacturing endless belts comprising a frame; a drive shaft rotatably supported in the frame from one end only thereof; a drum mounted on the drive shaft embodying a pair of generally cylindrical portions disposed in interfitting end-to-end relation to each other and defining a separable joint therebetween; reversible driving means for rotating the drive shaft and the drum in both a clockwise and a counterclockwise direction; means mounted adjacent the drum for shiftable movement axially of the drum for feeding belt materials to the drum adjacent the joint therein; means on the drum for actuating the feeding means; means on the feeding means for selective engagement with the actuating means; means actuated by the feeding means to control the operation of the driving means; and valve operated means for separating the drum portions on completion of the belt and for removal of the belt.

6. Apparatus for manufacturing endless reinforced belts comprising a rotatably mounted generally cylindrical drum of cantilever construction embodying two coaxially arranged segments forming therebetween a separable circumferential joint; reversible driving means for rotating the drum in a clockwise and in a counterclockwise direction; means mounted adjacent the drum for shiftable movement axially of the drum for feeding strandular reinforcing material to the drum; means on one of the segments of the drum for actuating the feeding means; means on the feeding means for selective engagement with the actuating means; switch means for stopping the driving means and limiting the extent of axial movement of the feeding means; means on the feeding means for operating the switch means; and pneumatic valve means for separating the drum segments at the joint therebetween.

7. Apparatus for manufacturing endless reinforced belts comprising a rotatably mounted generally cylindrical drum of cantilever construction embodying two coaxially arranged segments forming therebetween a separable circumferential joint; reversible driving means for rotating the drum in a clockwise and in a counterclockwise direction; means mounted adjacent the drum for shiftable movement axially of the drum for feeding strandular reinforcing material to the drum adjacent the joint therein; means on one of the segments of the drum for actuating the feeding means; means on the feeding means for selective engagement with the actuating means; a first switch means for stopping the driving means and limiting the extent of travel of the feeding means; a second switch means for preventing the rotation of the driving means in one of its directions of rotation while the feeding means is traveling; means on the feeding means for operating both switch means; and pneumatic valve means for separating the drum segments at the joint therebetween.

8. Apparatus for manufacturing endless reinforced belts comprising a rotatably mounted generally cylindrical drum embodying two coaxially arranged segments forming therebetween a separable circumferential joint; reversible driving means for rotating the drum in a clockwise and in a counterclockwise direction; a carriage mounted adjacent the drum for shiftable movement from a fixed starting position in a direction axially of the drum; a guide on the carriage for feeding strandular reinforcing material to the drum adjacent the joint therein; means on one of the segments of the drum for actuating the carriage; means on the carriage for selective engagement with the actuating means; a first switch means for stopping the driving means and limiting the extent of travel of the feeding means from its starting position; an adjustable abutment on the carriage for stopping the driving means after the carriage has been shifted a predetermined distance from its starting position; a second switch means for preventing the driving means from rotating in one of its directions of rotation while the carriage is being shifted; means on the carriage for operating the second switch means; biasing means on the carriage for returning it to its starting position; and a pneumatic cylinder for separating one of the drum segments from the other at the joint therebetween.

RAYMOND S. CARTER.
ELMER G. KIMMICH.

REFERENCES CITED

The following references are of record in the file of this patent:

UNITED STATES PATENTS

| Number | Name | Date |
|---|---|---|
| 1,805,032 | Berwick | May 12, 1931 |
| 1,885,708 | Gates | Nov. 1, 1932 |
| 1,911,185 | Gates | May 30, 1933 |
| 1,924,083 | Carter et al. | Aug. 22, 1933 |
| 2,367,821 | Davis | Jan. 23, 1945 |